United States Patent [19]

Silvestrini

[11] Patent Number: 5,766,002
[45] Date of Patent: Jun. 16, 1998

[54] APPARATUS FOR THERMALLY CONDITIONING CYLINDRICAL CONTAINERS

[75] Inventor: Jesus Antonio Silvestrini, Mendoza, Argentina

[73] Assignee: IMDEC, S.A., Mendoza, Argentina

[21] Appl. No.: 413,458

[22] Filed: Mar. 30, 1995

Related U.S. Application Data

[63] Continuation-in-part of Ser. No. 195,687, Feb. 16, 1994, abandoned.

[51] Int. Cl.$^6$ .................................. F27B 9/00; F27D 3/00
[52] U.S. Cl. ...................... 432/121; 432/236; 432/246; 414/159; 414/196; 198/413; 198/773; 198/777
[58] Field of Search ........................... 432/121, 236, 432/246; 414/152, 157, 159, 173, 196; 198/777, 773, 413

[56] References Cited

U.S. PATENT DOCUMENTS

| | | | |
|---|---|---|---|
| 1,193,836 | 8/1916 | Slick | 198/777 |
| 1,382,148 | 6/1921 | Walker | 414/152 |
| 1,525,905 | 2/1925 | Anthony | 414/159 |
| 3,361,418 | 1/1968 | Fromont et al. | 198/777 |
| 3,592,335 | 7/1971 | Meyer | 198/777 |
| 3,699,875 | 10/1972 | Wilson | 99/249 |
| 3,961,150 | 6/1976 | Lewis et al. | 219/10.49 |
| 4,075,972 | 2/1978 | Yamawaki et al. | 414/152 |
| 4,077,528 | 3/1978 | Santen | 414/152 |
| 4,142,304 | 3/1979 | Ricci et al. | 432/124 |
| 4,361,223 | 11/1982 | Johnson | 198/777 |
| 4,407,407 | 10/1983 | Eibe | 198/777 |
| 4,505,670 | 3/1985 | Silvestrini et al. | 432/124 |
| 5,006,063 | 4/1991 | Poggi et al. | 432/121 |
| 5,288,227 | 2/1994 | Righetti | 432/246 |

Primary Examiner—Henry A. Bennett
Assistant Examiner—Jiping Lu
Attorney, Agent, or Firm—C. Douglas McDonald, Jr. & Associates, P.A.

[57] ABSTRACT

Apparatus is disclosed for moving and thermally conditioning generally cylindrical containers in which the structure provides for movement of the containers about their axes and provides for a predetermined heat flow relative to the containers to change the temperature of the containers by a predetermined amount. The apparatus may be used for cooling of hot containers or for both heating the containers for sterilization and then subsequent cooling, if desired.

40 Claims, 13 Drawing Sheets

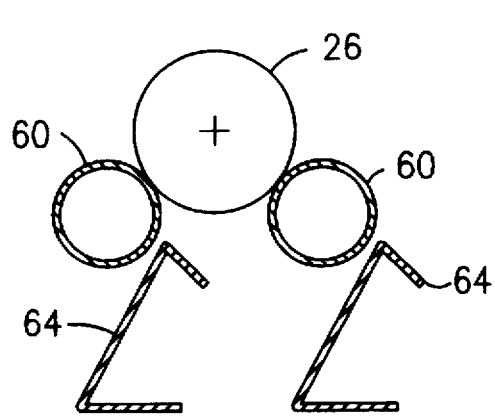
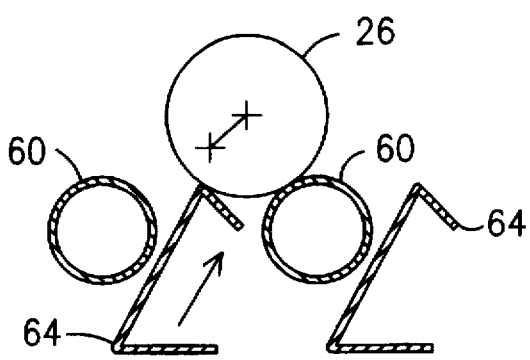
Fig. 3          Fig. 4
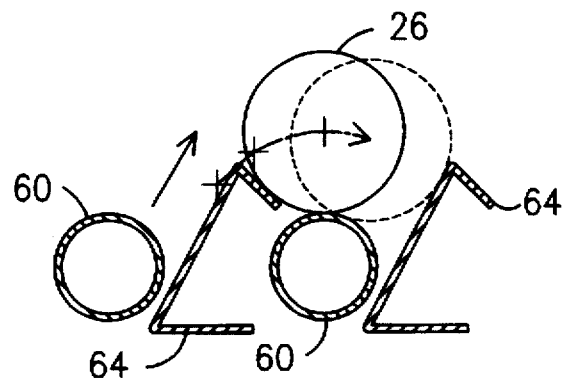
Fig. 5
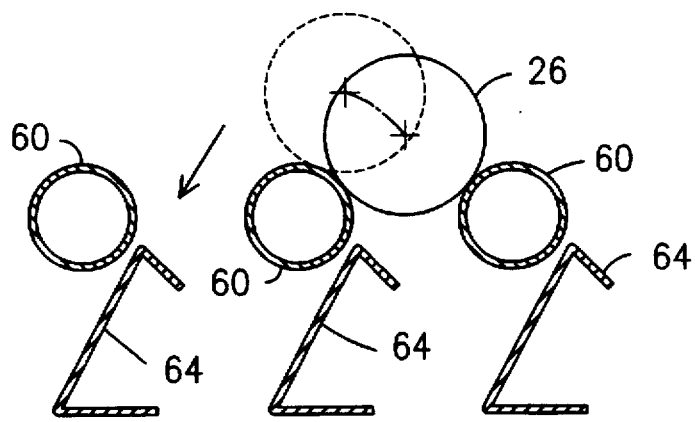
Fig. 6

APPARATUS FOR THERMALLY CONDITIONING CYLINDRICAL CONTAINERS

RELATED APPLICATION

This is a continuation-in-part of application Ser. No. 08/195,687 filed Feb. 16, 1994, and now abandoned.

BACKGROUND OF THE INVENTION

In the food processing and canning industry there has long been a requirement for heating and cooling the canned product. The same requirement exists for bulk packaging of such foods, as in drums of various sizes. The sterilize such a food product properly in a sealed container, it is necessary that the container be agitated at the same time that heat is applied to its exterior. Subsequent to the sterilization process, it is necessary to cool the container for subsequent handling and storage.

Various types of equipment have long existed for such thermal conditioning of cylindrical containers. Exemplary of such equipment is that shown in U.S. Pat. No. 2,607,698 to Martin and in my prior patent U.S. Pat. No. 4,505,670. In prior art such as the Martin patent a suitable conveyor has generally rolled the containers along a platform while shaking them and spraying them with a fluid of appropriate temperature. However, much of this equipment is limited in its usefulness by being capable of handling containers of only one size, thus requiring costly duplication of equipment or time-consuming conversions. In my prior patent some of these disadvantages were resolved, but that equipment was optimally suited for cooling and not heating, due to the open tunnel through which the container is moved.

SUMMARY OF THE INVENTION

It is an object of the present invention to provide an apparatus for moving and thermally conditioning generally cylindrical containers that overcomes the disadvantages of the prior art equipment. It is a further object of the invention to provide such apparatus that is rugged and durable and can provide for substantially continuous operation. It is yet another object of the invention to provide such equipment that is capable of handling several different sizes of containers without changes in the apparatus. An additional object of the invention is to provide such an apparatus that can provide for heating as well as cooling of such containers.

To achieve the foregoing, as well as other objects that will become apparent to those skilled in the art, apparatus for moving and thermally conditioning generally cylindrical containers is disclosed that includes a chamber for receiving the cylindrical containers, an entrance conveyor for carrying such containers from an entrance of the apparatus into the interior of the chamber, a removal conveyor for moving such containers from the chamber interior to a location external to the chamber, thermal conditioning apparatus within the chamber for effecting a predetermined heat flow relative to the container to change the temperature of the container by a predetermined amount, and a transfer structure within the chamber for moving the container from the entrance conveyor to the removal conveyor. In a preferred embodiment such apparatus is provided for both heating the containers to cook the food product contained inside and then cooling those containers for subsequent storage.

DESCRIPTION OF THE DRAWINGS

To illustrate further the principles of this invention, preferred embodiments will be described in detail in which:

FIGS. 3 through 6 are schematic views representing the motion of the indexing members of the transport mechanism of the apparatus of FIGS. 1A and 1B and 2;

DESCRIPTION OF PREFERRED EMBODIMENTS

Figure 1:
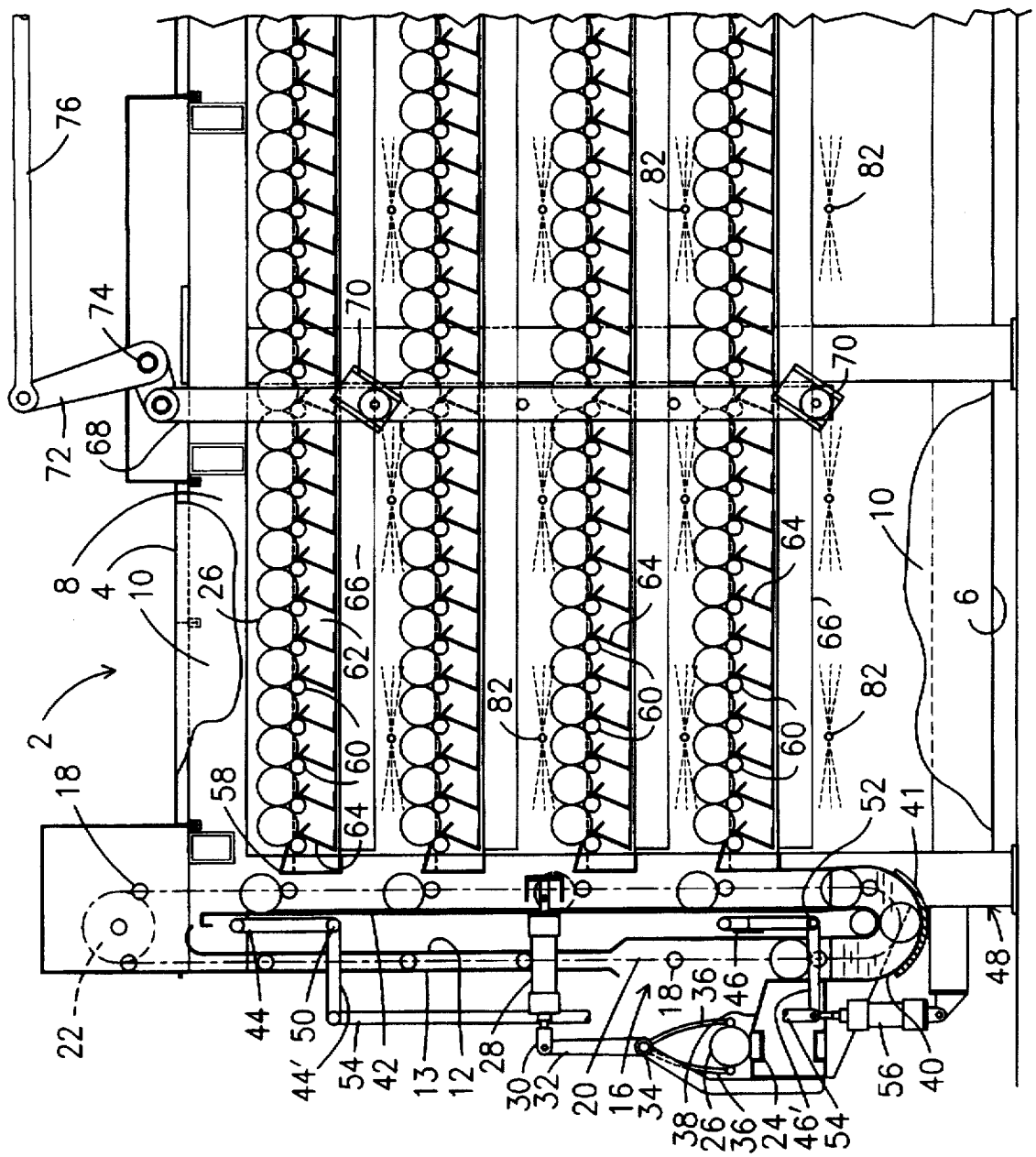
FIGS. 1A and 1B are side sectional elevations of two portions of a first preferred embodiment of the moving and thermal conditioning apparatus of this invention, illustrating the apparatus that is contained within a closed chamber.
Figure 2:
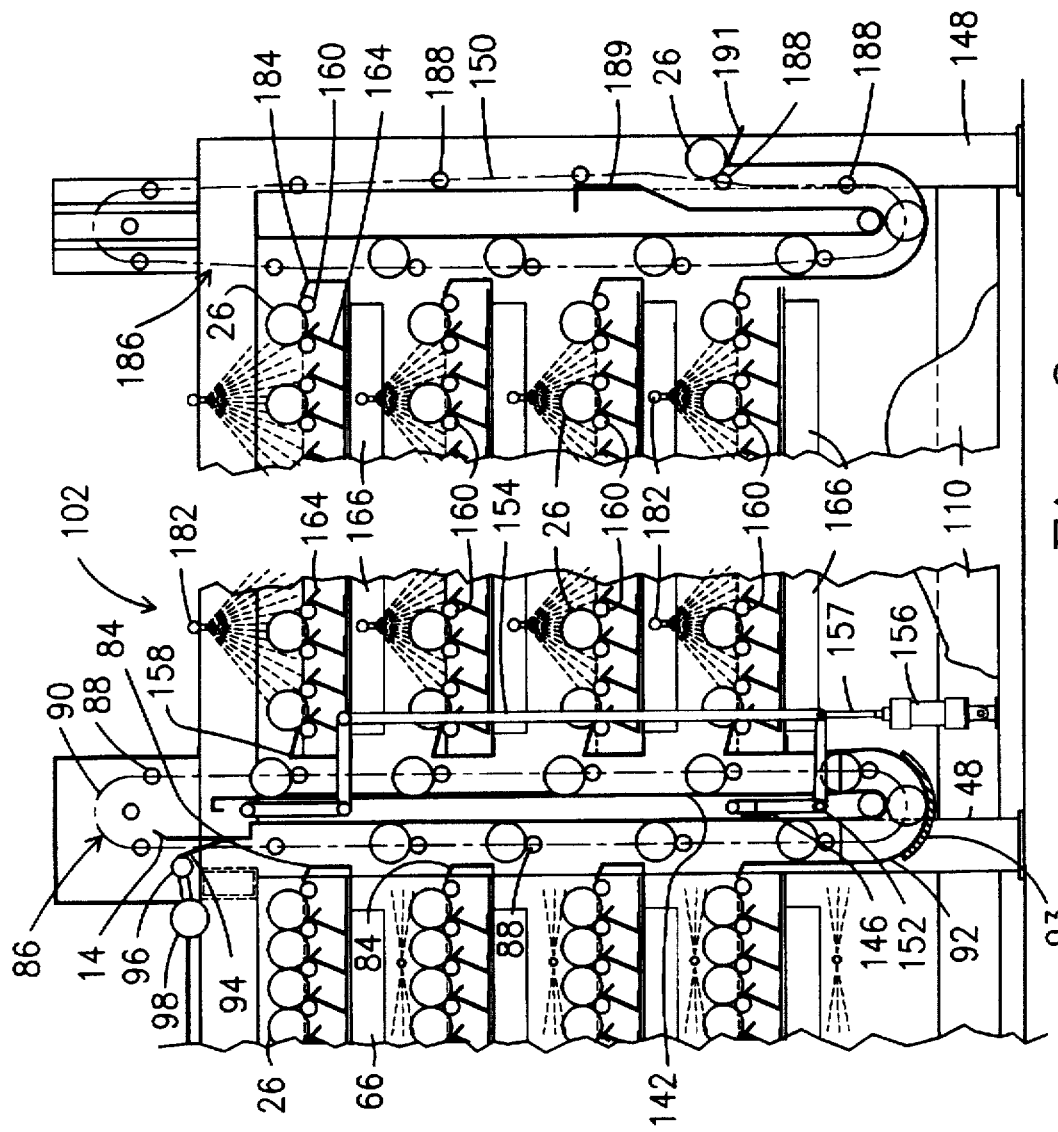
FIG. 2 is side sectional elevation of another portion of the apparatus of FIGS. 1A and 1B, showing a second thermal conditioning portion.

One preferred embodiment of the container moving and thermal conditioning apparatus of this invention is illustrated in the side sectional elevational views of FIGS. 1A and 1B and 2, which illustrate the moving and transport mechanism and thermal conditioning structure within a closed chamber 2 having a top wall 4, a bottom wall 6, a back side wall 8 and a front side wall 10 (which is shown as broken away to open the interior of the application for clarity of explanation), an entrance wall 12 and a chamber exit wall 14 (FIG. 2). At the left side of the illustration of FIGS. 1A and 1B there is a provided an entrance elevator or conveyor indicated by reference numeral 16. This entrance conveyor may be any of a number of conventional and well-known structures and is conveniently illustrated as comprising a plurality of feeder bars 18 carried by a chain 20 that moves around a closed path including upper sprocket 22 and a corresponding lower sprocket (not shown), with that upper sprocket 22 suitably being driven by conventional means, such as an electric or hydraulic motor, not shown but well known to those in the art.

Generally adjacent to and cooperating with the entrance conveyor 16 is an infeed apparatus, suitably including a conventional conveyor 24, such as a belt or chain, which brings the generally cylindrical containers 26, closed and filled with the food product to be processed to a position proximal this apparatus and in a generally horizontal configuration with the axis of such containers 26 in a direction generally normal to the plane of FIGS. 1A and 1B. When a container 26 has been brought to a position generally parallel to and adjacent the entrance conveyor 16, conventional and well-known timing apparatus energizes the actuator 28, which may conveniently be a hydraulic or pneumatic cylinder, thus urging the shaft 30 thereof outwardly of the cylinder, correspondingly moving the shaft 32 about pivot 34 to pivot the container guide arms 36 toward the entrance conveyor. This movement urges the container 26 off the infeed conveyor 24 and onto the inclined ramp 38, causing the container to roll down that ramp 38 to the position shown adjacent the foot of the ramp in FIGS. 1A and 1B, resting on one of the feeder bars 18.

Continuing movement of the entrance conveyor 16 lowers the feeder bar 18 and thus the container 26 into the curved tubular portion 40 of the enclosed entrance conveyor channel, which preferably is filled with a liquid, such as water, to function as a hydraulic lock, or P-trap, and thus serve as a preferred embodiment of a first environmental isolating means to isolate the internal environment of the chamber 2 from ambient conditions external to that chamber, thus preventing leakage of steam or fluid from inside the chamber to the outside. It has been found that the containers are sometime buoyant in the liquid of the hydraulic lock, floating out of their preferred orientation, aligned with the feeder bar 18, because of this buoyancy. In order to avoid this problem this embodiment incorporates means 41 for urging the containers toward the outside of the U-shaped path as the containers move through the hydraulic lock. Preferably, these urging means comprise apparatus for generating a magnetic field to attract the ferrous metal of the containers toward the outside of the hydraulic lock. In this embodiment the means 41 for generating the magnetic field to urge the containers to the outside of the U-shaped path may comprise one or a plurality of permanent magnets spaced around the lowermost portions of the U-shaped path of the entrance conveyor.

Continuing movement of the entrance conveyor 16 lowers the container 26 to a lowermost point of the curved portion 40, where it remains until the feeder bar 18 moving from behind that container 26 arrives to engage and push the container 26 from behind, to move it around that curved portion 40 and begin lifting it up the right side of the path of movement of that conveyor. The feeder bars 18 are positioned, with respect to a given container 26, to engage that container in this upward movement at a point to the left, on FIGS. 1A and 1B, of the center of gravity of that container, thus urging the container upwardly while causing it to ride against the loading plate 42. This loading plate 42 is mounted to the ends of actuator links 44 and 46, which are mounted to the apparatus frame, generally indicated by reference numeral 48, at respective pivot mounts 50 and 52. These actuator links 44 and 46 preferably are bellcranks in the shape of a reverse L with extensions 44' and 46' extending away from the pivot mounts. These portions are pivotally connected to actuator arm 54, which is attached to actuator 56, which may conveniently be a hydraulic or pneumatic cylinder, the opposite end of which is also attached to the mounting frame 48.

When actuator cylinder 56 is energized, therefore driving arm 54 upwardly, both of the actuator links 44 and 46 are rotated in a counterclockwise direction about their respective pivot mounts 50 and 52. Because these links are connected to loading plate 42, this movement urges loading plate 42 to the right in FIGS. 1A and 1B. The actuation of the cylinder 56 is synchronized, by conventional and well-known means, to urge the loading plate 42 to the right when the entrance conveyor is in substantially the position shown in FIGS. 1A and 1B, when each container 26 being carried upwardly on that entrance conveyor 16 is adjacent an inclined working surface 58 adjacent a container transport line. In the embodiment illustrated in FIGS. 1A and 1B there are provided four such working surfaces 58, each aligned with a transport line for transporting the containers 26 from the entrance conveyor to a removal conveyor, in a manner to be described below.

As the loading plate 42 moves to the right in FIGS. 1A and 1B, the containers are pushed to the right, such that the center of gravity of each container is moved over and to the right of the feeder bar 18 supporting that container, thus allowing each of the containers 26 to roll off the entrance conveyor, down the ramp 58 of the respective working surface and into supporting engagement with a pair of adjacent supports, which may conveniently be rollers 60, each of which preferably has a longitudinal axis extending generally transversely of the direction the containers are moved by the transporter.

As noted above, in this embodiment there are four working surface or transport systems, although any suitable number, including one, may be used. The transports of this preferred embodiment are each defined by two main sets of elements, a stationary set and a moving set. In this embodiment the stationary set of elements is formed by a plurality of the supporting rollers 60 spaced from one another with the respective axes of said rollers being aligned generally parallel to one another and with adjacent such rollers 60 being spaced from at least one adjacent such roller in a generally horizontal direction a predetermined distance less than the diameter of any container 26 to be used thereupon. In this manner adjacent such pairs of the rollers 60 will support one such cylindrical container 26 therebetween with the axis of that container being generally parallel to the axes of the rollers. Each of these rollers 60 is preferably mounted to a chassis 62 the chamber 2 for rotational movement within that chamber. This working surface formed of these rollers, which comprises a portion of the transport for transporting the containers from the entrance conveyor to a removal conveyor, is further provided with a conventional rotational drive structure (not shown) for rotatably driving all adjacent such pairs of rollers 60 in a common direction. This drive structure may suitably take the form of a sprocket on the end of each roller operatively engaging a drive chain passing immediately adjacent thereto and driven by conventional means, such as an electric or hydraulic motor.

The working surface or transport means further comprises indexing means for urging the containers from support by one said pair of adjacent rollers 60 to support by another pair of rollers adjacent thereto and in the direction of transport, to the right in the embodiment of FIGS. 1A and 1B. This indexing means comprises at least one indexing member 64, in the form of nonrotatable support, conveniently of the type shown in greater detail in FIGS. 3–6, interposed generally between each adjacent pair of such rollers 60 and mounted to an indexing chassis 66 that is movable with respect both to the chamber 2 and to the roller chassis 62. As will be described below, this chassis is mounted for movement both upwardly and generally in the direction extending from the entrance conveyor toward a removal conveyor, to the right in FIGS. 1A and 1B.

Each of the indexing chassis 66 carrying the indexing members 64 is operatively attached to actuator bars 68 which, in turn, are carried for either sliding or rolling movement within guides 70 attached to the frame 48 for movement in a direction diagonally upwardly and to the right of FIGS. 1A and 1B. The respective actuator bars 68 are pivotally attached to respective bellcranks 72, which are mounted by pivots 74 to the frame 48 for pivoting movement thereabout. The two bellcranks 72 are linked together by connector shaft 76 and are operatively attached to the actuator 78, which is also mounted to a portion of frame 48. The actuator 78 may suitably be a hydraulic or pneumatic cylinder that is selectively energized to urge the shaft 80 thereof outwardly in a reciprocating manner at selected times. When that shaft 80 is urged outwardly, the bellcranks 72 will be rotated in a clockwise direction, thereby lifting up on the actuator bars 68 and moving those actuator bars, the indexing chassis 66, and thus the indexing members 64, substantially in the direction in which guides 70 are oriented. The results of this actuation are illustrated most clearly in the schematic representation of FIGS. 3 through 6.

The movement of the indexing member is shown in these FIGS. 3 through 6, which is a schematic representation showing only the relationship between the rollers 60, the indexing member 64 and the container 26 affected thereby, with the supporting structures and the like being omitted to simplify the explanation. FIG. 3 represents the condition in which the shaft 80 of the actuator cylinder 78 is retracted, such that each container 26 is rotatably supported on an adjacent pair of rollers 60 for rotation thereby, and with the indexing member 64 out of engagement with such container. As the actuator 78 is energized, the indexing members 64, carried by their chassis (not shown) move upwardly and to the right, engaging the container at a point below and to the left of its center of gravity. This movement thus urges the container upwardly and to the right in these figures, with that container thus being supported only on the indexing member positioned between the two original supporting rollers 60 and the roller 60 on the right side of that original pair in these illustrations. As movement of the shaft 80 with actuator 78 continues to its maximum extent, the indexing members 64 are urged further upwardly and to the right to the position shown in FIG. 5. In this position the indexing member 64 engaging a particular container 26 urges that container sufficiently upwardly and to the right to move the center of gravity of that container past the center line of the roller 60 upon which it is being partially supported. At this point the container 26 will then roll over the top of that roller 60 until it is in engagement with that same roller 60 and the next indexing member 64 to the right, all as shown in FIG. 5. At this point the actuator 78 is deenergized, thereby retracting the shaft 78 and rotating the bellcranks 72 counterclockwise back to their original positions, shown in FIGS. 1A and 1B, which lowers the indexing members to their original positions spaced generally below the rollers 60. In this manner the container 26 is lowered into its engagement with an adjacent pair of rollers 60, comprising one of the original pair of rollers as well as the next such roller to the right in these illustrations. At this point any desired continued rotation of the container 26 may be resumed. At a predetermined time, synchronized with the movement of the entrance conveyor 16 the entire operation of this transport structure illustrated in FIGS. 3 through 6 will be repeated, thereby sequentially stepping each container 26 along for support between successive adjacent pairs of rollers as that container is moved through the chamber toward the removal conveyor.

Through the use of this transport mechanism incorporating the described plurality of adjacent, generally parallel rollers 60, with adjacent such rollers being spaced apart a distance less than the diameter of the smallest cylindrical container 26 to be processed, it should be apparent that a wide range of container sizes can be accommodated on the same equipment with virtually no changes being made. If desired, appropriate guide rails extending transversely of the roller axes may be provided to maintain the containers in desired positions with respect to the axial ends of the rollers. Such guides, which may suitably take the form of bars extending transversely across the transport mechanism above the surface of the roller 16, may, if desired, be made adjustable to controllably accommodate containers of various axial lengths. Also, where it is desired to utilize containers substantially larger in diameter than those shown in the accompanying illustrations, and which may overhang several adjacent rollers, such containers can easily be accommodated by adjusting the timing mechanism to deposit the containers onto the transport mechanism rollers such that each said container is spaced from the next subsequent container by two or more intervening such rollers 60. In this manner, the apparatus may be utilized for cylindrical containers ranging from conventional cans up to considerably larger containers, including drums, all without substantial structural modification of the apparatus. This can provide significant savings in equipment costs and in processing plant floor space by being able to utilize the same equipment to meet a number of different needs.

While the container is transported through the chamber 2, it will also be thermally conditioned. In this preferred embodiment there are shown two successive chambers. In the first chamber 2, shown in FIGS. 1A and 1B, the preferred thermal conditioning apparatus comprises a plurality of jets 82 of steam used to heat the containers and their contents to a cooking and sterilizing temperature. In this embodiment a second chamber 102 is provided for subsequent cooling of the containers and their contents. However, it should be apparent that, if desired, a single chamber structure could be provided to serve only as a cooling chamber for containers holding already heated and cooked food products, or hot and cold sprays could be used sequentially in the same chamber.

As the containers 26 are moved along the transport they ultimately reach the last pair of support rollers 60, the last roller being positioned adjacent a ramp 84 forming the end of that transport (FIG. 2). As the indexing members 64 urge the containers past that last roller 60, the containers will engage a respective inclined ramp 84 and roll down that ramp into engagement with a removal conveyor, generally indicated by reference numeral 86. This conveyor suitably may be of substantially similar construction to the entrance conveyor 16, including a plurality of feed bars 88 carried by an endless chain 90 around appropriate drive sprockets (not shown) and suitable guides, all of which may be conventional. This removal conveyor 86 preferably is synchronized to the entrance conveyor and thus to the container transport mechanism.

Containers 26 deposited onto this removal conveyor 86 are then carried downwardly into the curved, generally U-shaped trough portion 92 of the enclosed removal conveyor channel and then back up the other side, in the manner described with respect to the entrance conveyor 16. As with the entrance conveyor the curved trough 92 at the bottom of the travel of the conveyor of this embodiment is preferably filled with a liquid, such as water, to form a hydraulic lock, or P-trap, to serve as a portion of a second environmental isolating means to isolate the interior environment of the chamber 2 from the exterior conditions or from the second chamber that will be described below. Also, as with the entrance conveyor, the curved, U-shaped portion of the trough 92 is provided with means 93, preferably one or a plurality of permanent magnets positioned around the outside of the lowermost portion, to urge the containers toward the outside of the path to maintain them in alignment with the feed bars 88.

At the upper portion of the travel of removal conveyor 86, shown in FIG. 2, is provided another portion of this second environmental isolating means. Specifically, a door structure biased toward a closed position, bearing against an extended portion of the wall 14 is shown, with that door 94 being pivotally mounted to the frame 48 by pivot 96 and biased toward a closed position against that wall 14 by conventional means, such as counterweight 98. In this manner, the passage of one of the feeder bars 88 by the door 94 will serve to push that door aside momentarily to permit the passage of the feeder bar 88, with the counterweight 98 then urging the door 94 back to a closed position until the next feeder bar 88 passes.

It should also be noted that the portion of the entrance conveyor 16 between a point near the upper portion of the travel of that conveyor and the point of entrance of new containers 26 onto the conveyor is preferably provided with an additional portion of the first environmental isolating means. In this preferred embodiment this additional portion of the first environmental isolating means comprises a restricted path through which pass the feeder bars 18 and chain 20, and which comprises the entrance wall 12 and a facing wall 13 that are spaced to permit passage of the feeder bars 18 and chain 20 therethrough, while substantially reducing any communication between the internal environment of the chamber 2 and ambient external conditions.

As shown in FIG. 2, the container removal conveyor 86 also functions as the entrance conveyor for the second chamber 102. This chamber, fabricated in substantially the same manner as the first chamber 2, may conveniently provide for the cooling of the containers 26 received from that first chamber. Accordingly, because most of the components in this second chamber 102 preferably function in a manner analogous to corresponding portions of the first chamber, the components in this chamber are numbered in a corresponding manner, increased by 100.

In this second chamber 102 the container introducing conveyor 86, which also serves as the removal conveyor for the first chamber 2, lifts the various cylindrical containers 26 upwardly, with those containers riding against the loading plate 142. This loading plant 142 is supported by actuating links or bellcranks 144 and 146, that are pivotally mounted in a manner described with respect to the first chamber, and are interconnected by connector bar 154 and operatively attached to actuator 156, which may conveniently be a pneumatic or hydraulic cylinder. The actuator 156 of this preferred embodiment has one difference from that of actuator 56 in the first chamber, in that its actuation effects a retraction of the piston rod 157, instead of extension of the piston rod as with actuator 56. With that retraction, the actuator links 144 and 146 are rotated in a clockwise manner about their pivotal mounts 150 and 152 to urge the containers 26 being carried by that conveyor or elevator 86 to the right in FIG. 2, sufficiently that the center of gravity of the containers 26 are moved to the right of the feeder bars 88, whereby they are released from that conveyor and roll down the ramps 158 of the transport mechanism into supporting engagement with a pair of adjacent support rollers 160 of the transport mechanism, of which there are again illustrated four sets in this embodiment. This transport mechanism, with its indexing members 164 carried by the reciprocally moving chassis 166, preferably operates in a manner exactly analogous with that of the transport mechanism of the first chamber, stepping the containers 26 sequentially to the right in FIG. 2, with the rollers 160 preferably being rotatably driven, again in a manner analogous to that occurring in the first chamber 2. While in this second chamber 102 the containers are additionally thermally conditioned, suitably by cooling, and preferably by being bathed by sprays 182 of a cooling fluid, such as water. Preferably, the water is collected in the base of this second chamber 102 and recirculated, either with or without external cooling.

As with the first chamber, when those containers 26 in the second chamber 102 are urged by the indexing members 164 past the last support roller 160 of the transport apparatus supporting that container, the containers will engage the inclined ramp 184 and roll down that ramp into engagement with a final removal or discharge conveyor, generally indicated by reference numeral 186. This conveyor suitably may be of substantially similar construction to the removal conveyor 86 described above, although it is not necessary to include the environmental isolating apparatus, such as the hydraulic lock 92, where this cooling chamber is being used to reduce the temperature of the containers 26, preferably to about ambient temperature. As the containers 26 are moved around the path of that discharge conveyor 186, on the upward path, while supported by the feeder bars 188, the containers will engage an outwardly inclined surface of the wall 189 adjacent that conveyor. Engagement with this inclined wall will serve to urge the container 26 to the right of the feeder bar 188, in a manner analogous to that resulting from the movement of the loading bar 142, thus moving the container 26 out of supporting engagement with the feeder bar 188, so that it may roll down the inclined ramp 191 into a suitable discharge area, which may conveniently include either a bin or an additional removal conveyor, functioning in a manner analogous to the infeed conveyor 24 described with respect to chamber 1, above. While a hydraulic lock could be provided in connection with this conveyor 186 to isolate the cooling section of the thermal processing unit from outside ambient conditions, such is generally not necessary where the cans are being cooled to near ambient temperature inside the chamber before exiting on conveyor 186. At this point the processing of the containers effected by this apparatus is substantially completed.

FIGS. 7 through 11 illustrate a variation on the apparatus illustrated in FIGS. 1 through 6. The principal difference between this alternative embodiment and that of the apparatus of FIGS. 1 through 6 is the mechanism for and manner of operation of the indexing apparatus of the transport structure. Because the remaining elements of this apparatus preferably are substantially the same as with the previous embodiment, the disclosure of that previous structure is hereby incorporated by reference, and only the portions of the apparatus that differ will be described in detail.

Figure 7:
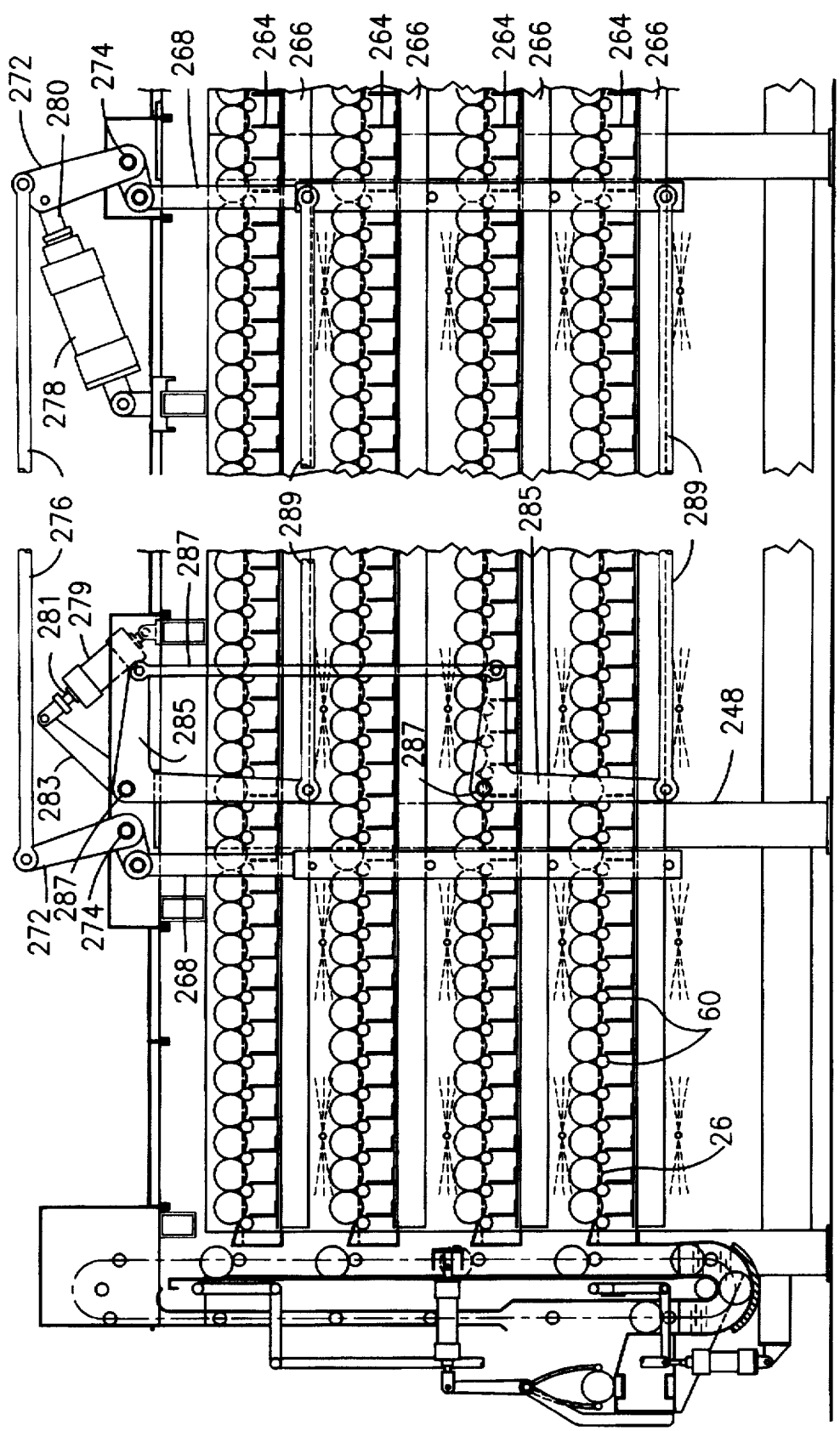
FIG. 7 is a side sectional elevation of a second embodiment of the moving and thermal conditioning apparatus of this invention, generally similar to the embodiment of FIGS. 1A and 1B and 2 but incorporating a different transport mechanism.
Figure 8:
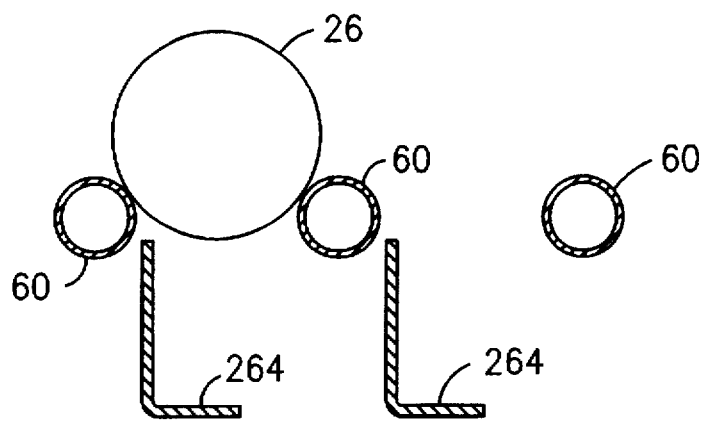
FIGS. 8 through 11 are schematic representations illustrating the movement of the indexing members of the transport apparatus of this second embodiment of FIG. 7.
Figure 9:
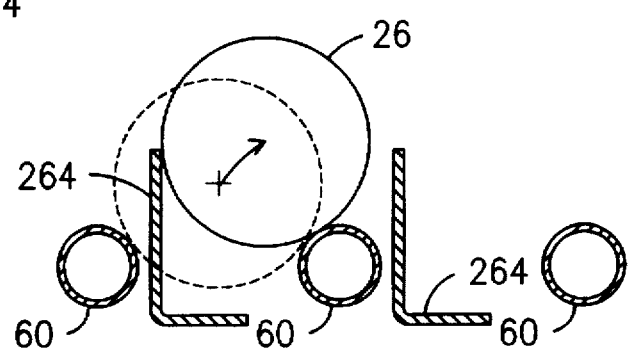

As shown in FIG. 7, an actuator 278, comparable to actuator 78 in FIGS. 1A and 1B, is mounted to the support frame of the apparatus with piston rod 280 connected to bellcrank 272, which is mounted by pivot 274 to the frame and is connected by connector shaft 276 to a similar bellcrank 272, also mounted to the frame through a pivot 274. By reciprocal movement of the piston rod 280 of actuator 278 there is effected selected pivoting movement of the bellcrank 272 in a clockwise direction as the piston rod 280 is extended and in a counterclockwise direction as that piston rod is retracted. Such movement effects a generally vertically upward movement of the actuator bars 268 that carry the chassis 266, to which are mounted the indexing members 264. As shown on FIGS. 7 and on FIGS. 8 through 11, these indexing members 264 are suitably of the configuration of an L-shaped member having an upwardly extending portion connected to a base that is carried on the chassis 266.

A second actuator 279, suitably in the form of a reciprocally acting cylinder, has a piston rod 281 extending from it and pivotally connected to linkage 283, which, in turn, is connected to bellcrank 285. This bellcrank 285 is, in turn, connected through link 287 to a second bellcrank 285, and both of these bellcranks 285 are mounted for movement about a pivot point 287 carried by the frame 248. The ends of these bellcranks 285 remote from the connection to link 287 are each attached to one end of actuator shaft 289, the opposite end of which is attached to one of the actuator bars 268. In this manner reciprocating movement of the piston rod 281 outwardly of the actuator 279 will effect a rotation of the bellcranks 285 in a counterclockwise manner, lifting the actuator linkage 287 and urging each of the actuator shafts 289 to the right in FIG. 7. Correspondingly, retraction of the piston rod 281 will effect an opposite rotation of the bellcranks and corresponding movement of the actuator links 289 to the left in this figure.

Figure 10:
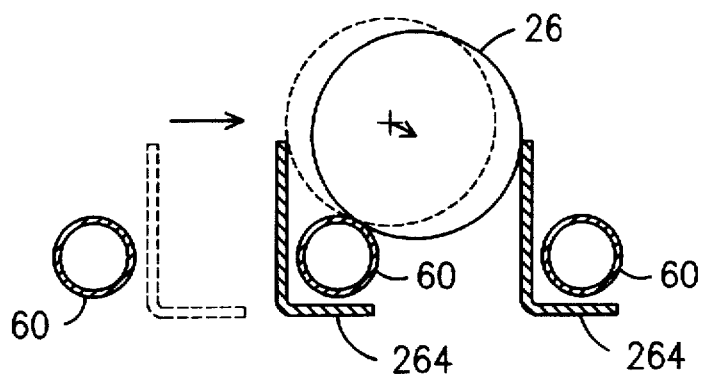
Figure 11:
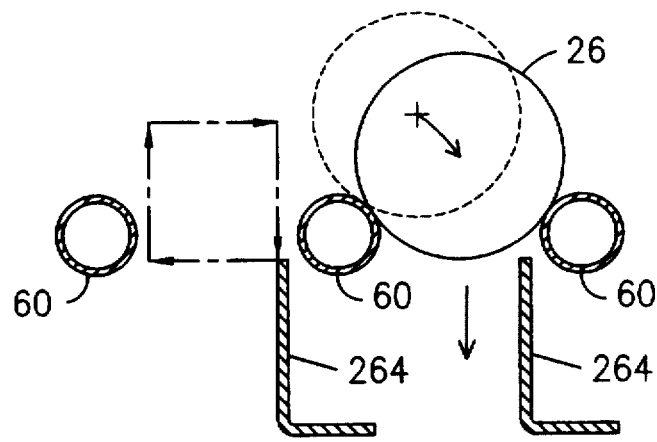

The results of the operation of the actuators 278 and 279 are shown in FIGS. 8 through 11. When both of the actuators are in their initial position with their respective piston rods 280 and 281 retracted, the indexing members 264 are in their retracted position, shown in FIG. 8, out of engagement with the containers 26 that are carried on the support rollers 60 of the transport. As actuator 278 is energized, urging the piston rod 280 outwardly, the actuator bars 268 are lifted, thus urging the chassis members 266 and their respective indexing members 264 upwardly, in the manner shown in the schematic illustration of FIG. 9. In this position the indexing member has suitably been moved substantially straight up from its original position shown in FIG. 8. This indexing member 264 is preferably positioned so that, in the positions of FIGS. 8 and 9, when the actuator 279 is deenergized with the piston rod 281 retracted, those indexing members 264 are spaced to the side of the center of gravity of the container 26 that is closer to the entrance conveyor, which is to the left in these drawings. Thus, the upward movement illustrated in FIG. 9 will lift the container 26 out of engagement with one of the support rollers 60 so that it is supported by the indexing member 264 and the other of the original pair of support rollers 60. At this point a conventional timing or synchronizing mechanism will then energize actuator 279, urging its piston rod 281 outwardly and rotating the bellcranks 285 in the counterclockwise direction. This urges the shafts 289 to the right in FIG. 7, correspondingly moving the chassis 266 and their supported indexing members 264 also to the right, to the position depicted in the schematic illustration of FIG. 10. This movement of the indexing member, in a direction toward the removal conveyor (to the right in these figures) urges the container 26 also in that same direction, to the point that the center of gravity of that container moves past the center of the support roller 60 upon which it is partially supported, so that the container 26 then rolls over that support roller 60 into supporting engagement with that same roller and with the next indexing member 264, as shown in FIG. 10. At this point the actuator 278 is deenergized, retracting the piston rod 280 and rotating the bellcranks 272 in a counterclockwise manner thus lowering the actuator bars 268 and thus the chassis 266 and their associated indexing members 264 to the position shown in FIG. 11. This lowers the indexing members 264 out of engagement with the container 26 and lowers that container 26 into supporting engagement with this pair of support rollers that is the next adjacent pair of such rollers to the original pair. At this point the actuator 279 is deenergized, withdrawing its piston rod 281 and rotating the bellcranks 285 in a clockwise direction back to the original position depicted in FIG. 7. This moves the actuator shafts 289 back to their original position, thereby moving the chassis 266 and the indexing members 264 supported thereupon back to the original position shown in FIG. 8. In FIG. 11 is shown a broken line square depicting the path of movement of the uppermost point on the indexing member 264 during this entire indexing or transporting movement.

FIGS. 12 through 16 depict a modified structure for the elevator-type entrance, removal and discharge conveyors, along with an alternative structure for releasing the containers from those conveyors onto the transport mechanisms described above. These conveyor structures provide additional benefits in eliminating the use of the loading plate and its actuating mechanism, conveniently substituting a selectively openable gate arrangement.

The entrance conveyor, generally indicated by reference numeral 316, conveniently utilizes the same type of infeed apparatus as described with respect to FIGS. 1A and 1B, with an inclined ramp 338, down which the containers 26 roll onto the feeder bars 318, which conveniently are carried by a mechanism such as chains 320. However, these feeder bars 318 are preferably of a generally flat configuration and dimensioned to substantially fill the passageway or channel defined by the opposing walls 312 and 313. Also, these feeder bars are preferably inclined downward to the right in the orientation depicted in FIGS. 12 through 16, so that containers supported on those feeder bars 318, in the downward path of their travel from the inclined ramp 338, will be urged against the inner wall 312 of this conveyor channel and, on the portion of their travel upward from the lowermost point of this elevator-type conveyor, are urged outwardly against the outer wall portion 313. As with the embodiments of FIGS. 1, 2 and 7, a permanent magnet structure 317 is preferably included outside the lowermost portion of the U-shaped conveyor path to urge the containers 26, which preferably are made with a ferrous metal, toward the outside of that U-shaped path. This structure may also be provided with the intermediate conveyor illustrated in FIG. 13 below.

Figure 15:
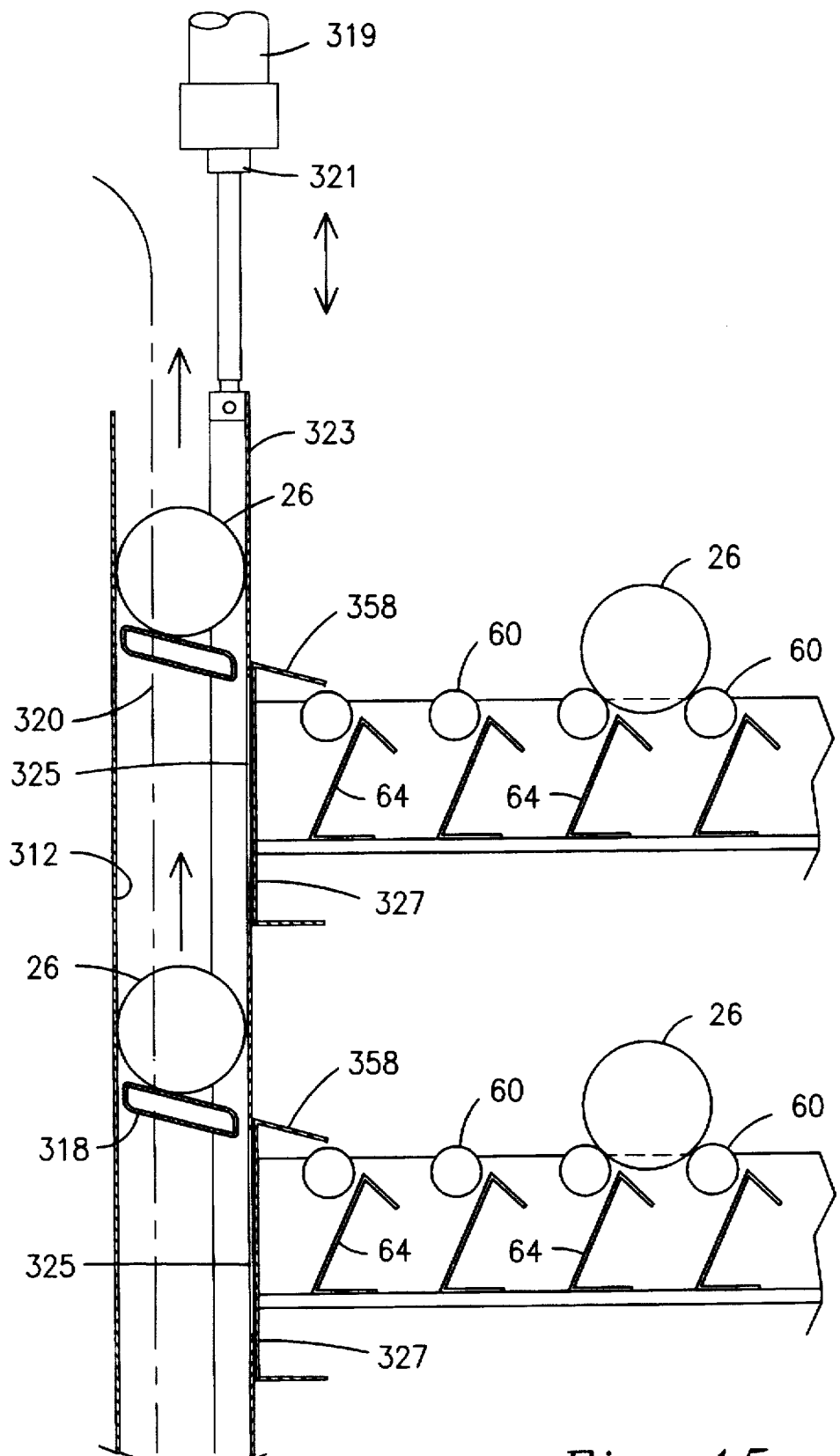
FIGS. 15 and 16 are fragmentary side sectional views of a portion of the conveyor apparatus of FIG. 12 illustrating the operation of the gate slide.
Figure 16:
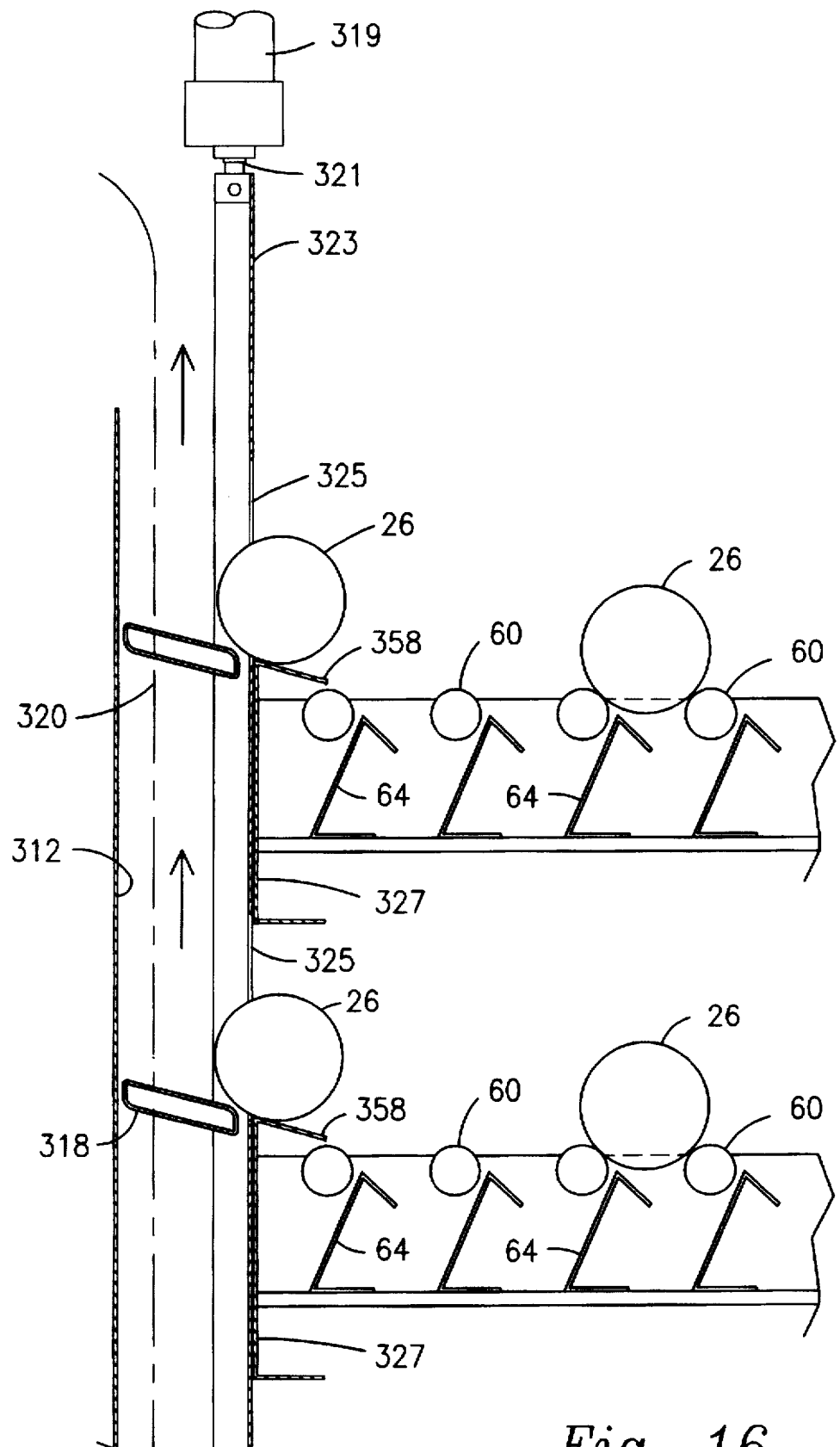

This embodiment utilizes a simpler mechanism for affecting discharge of the containers 26 from the entrance conveyor, differing from the actuated loading plate mechanism disclosed with respect to FIGS. 1A and 1B above. Specifically, this mechanism utilizes an actuator 319, which may suitably be a hydraulic or pneumatic cylinder having a reciprocally moving piston rod 321 that is connected to a gate slide 323, which is carried for reciprocal sliding movement in the direction of the arrows indicated in FIGS. 15 and 16. In FIG. 15, with the piston rod 321 extended, the gate openings 325 in this gate slide 323 are positioned adjacent fixed members 327 of the chamber 302, so that containers 26 being lifted by the feeder bars 318 of the entrance conveyor 316 preferably will be carried past the successive inclined ramps 358 leading down to the support rollers 60, described above. At such time as it is desired to discharge a container 26 onto one or each of the plurality of transport mechanisms shown, the actuator 319 is operatively energized to retract the piston rod 321, lifting the gate slide 323 to the position depicted in FIG. 16, which moves the opening 325 in that gate slide 323 to a position adjacent an opening onto the inclined ramps 358 to allow the container 26 to roll free of the feeder bar 318 of the entrance conveyor, down that ramp 358 into supporting engagement with a first pair of support rollers 60, which function in the manner described above. Once these containers have been so discharged, the gate slide is again urged by actuator 319 to the closed position shown in FIG. 15 so that a plurality, such as four, of containers 26 may again be raised into a position for suitably simultaneous discharge onto the four transports of this embodiment, and the operation is repeated. In FIG. 13 is depicted the use of a removal conveyor for removing the containers 26 from the first chamber 2 and introducing them into the second chamber 102, as described above with respect to FIGS. 1A and 1B and 2. In the embodiment of FIG. 13 there is used an elevator-type conveyor substantially similar to that of FIG. 12, including the use of an actuator 319 for operating a slide gate for depositing the containers 26 onto the transport mechanism of this second chamber 102. The conveyor of FIG. 13 is substantially the same as that of FIG. 12, with the exception of having a plurality of entrance openings, one for each of the transport mechanisms of the first chamber 2, instead of the single entrance shown with respect to the entrance conveyor apparatus of FIG. 12.

Figure 13:
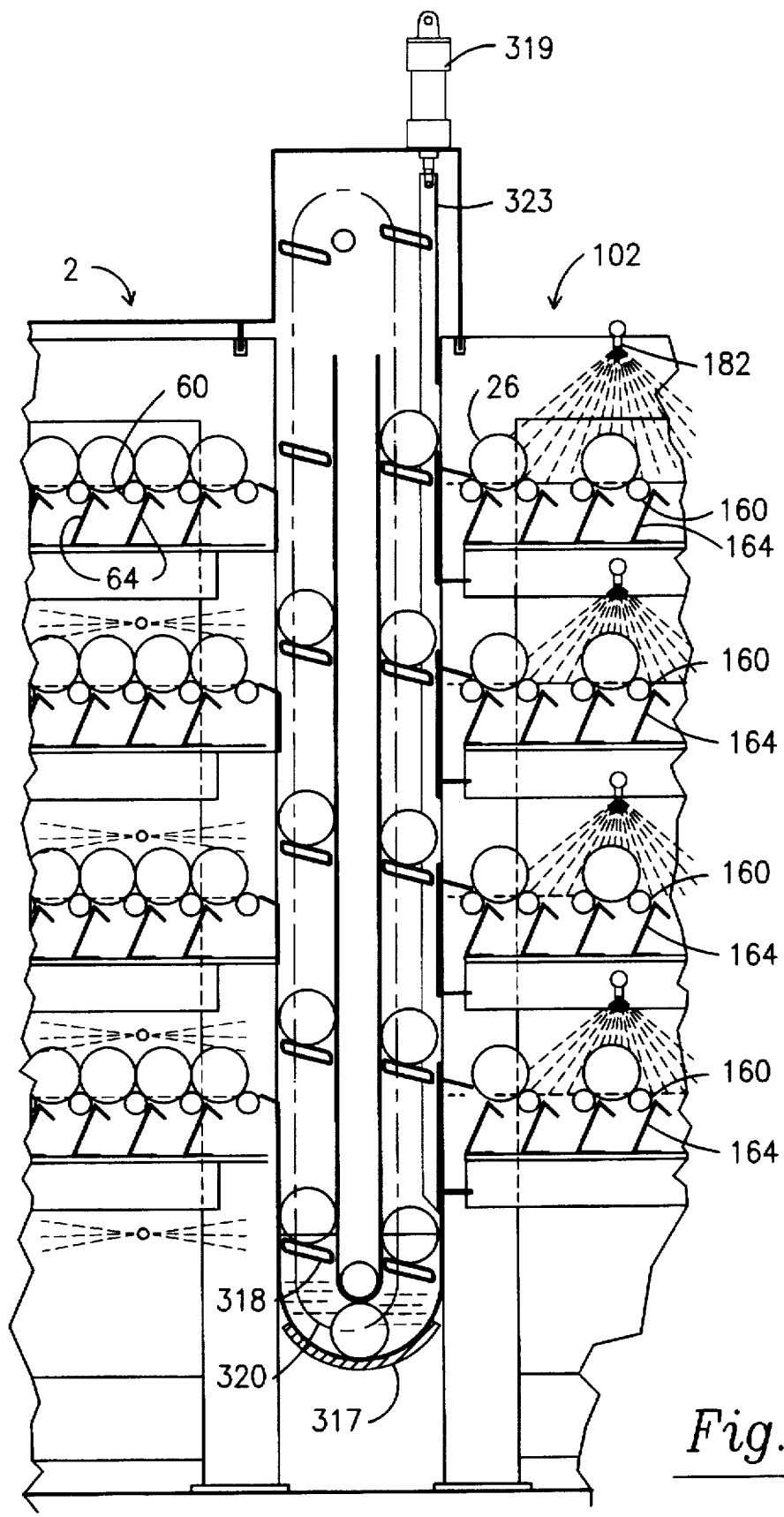
FIG. 13 is a side sectional view of an alternative embodiment of a removal conveyor for use with the apparatus of FIGS. 1A and 1B and 2.
Figure 14:
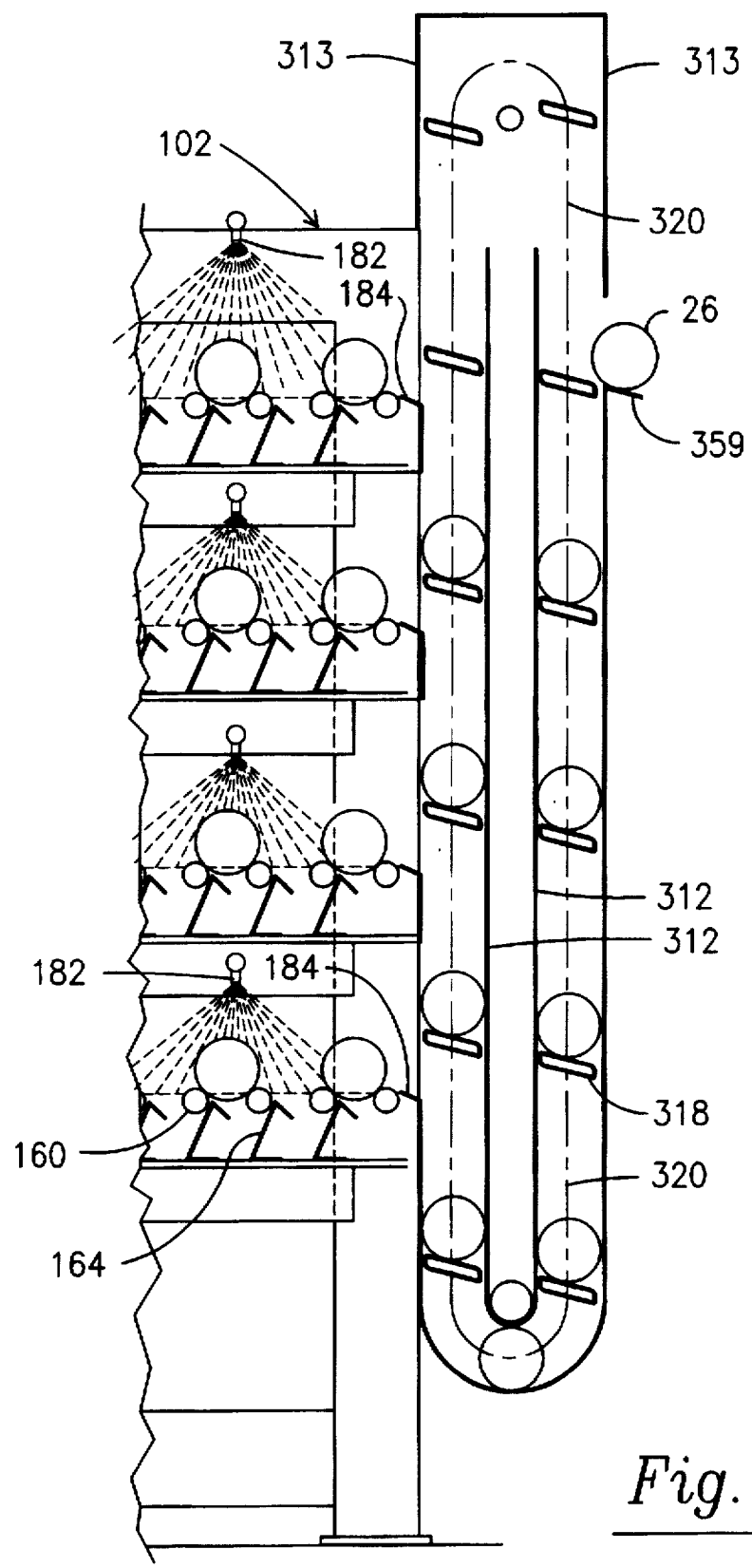
FIG. 14 is a side sectional view of an alternative discharge conveyor for use with the apparatus of FIG. 2.

In FIG. 14 is shown a discharge conveyor for discharging the containers 26 from the second chamber 102. This conveyor is of substantially similar construction to that of FIG. 13, with the multiple entrance openings of that FIG. 13 apparatus, but with a single exit opening through the outer wall 313 on the side away from the second chamber 102, opening onto a discharge ramp 359. The discharge conveyor of this FIG. 14 may also dispense with the use of the actuator 319 and the slide gate 323 described above with respect to the corresponding structures of FIGS. 12 and 13. Thus, the containers 26 are conveniently discharged from this conveyor mechanism of FIG. 14 whenever they reach the opening adjacent that ramp 359.

Figure 17A:
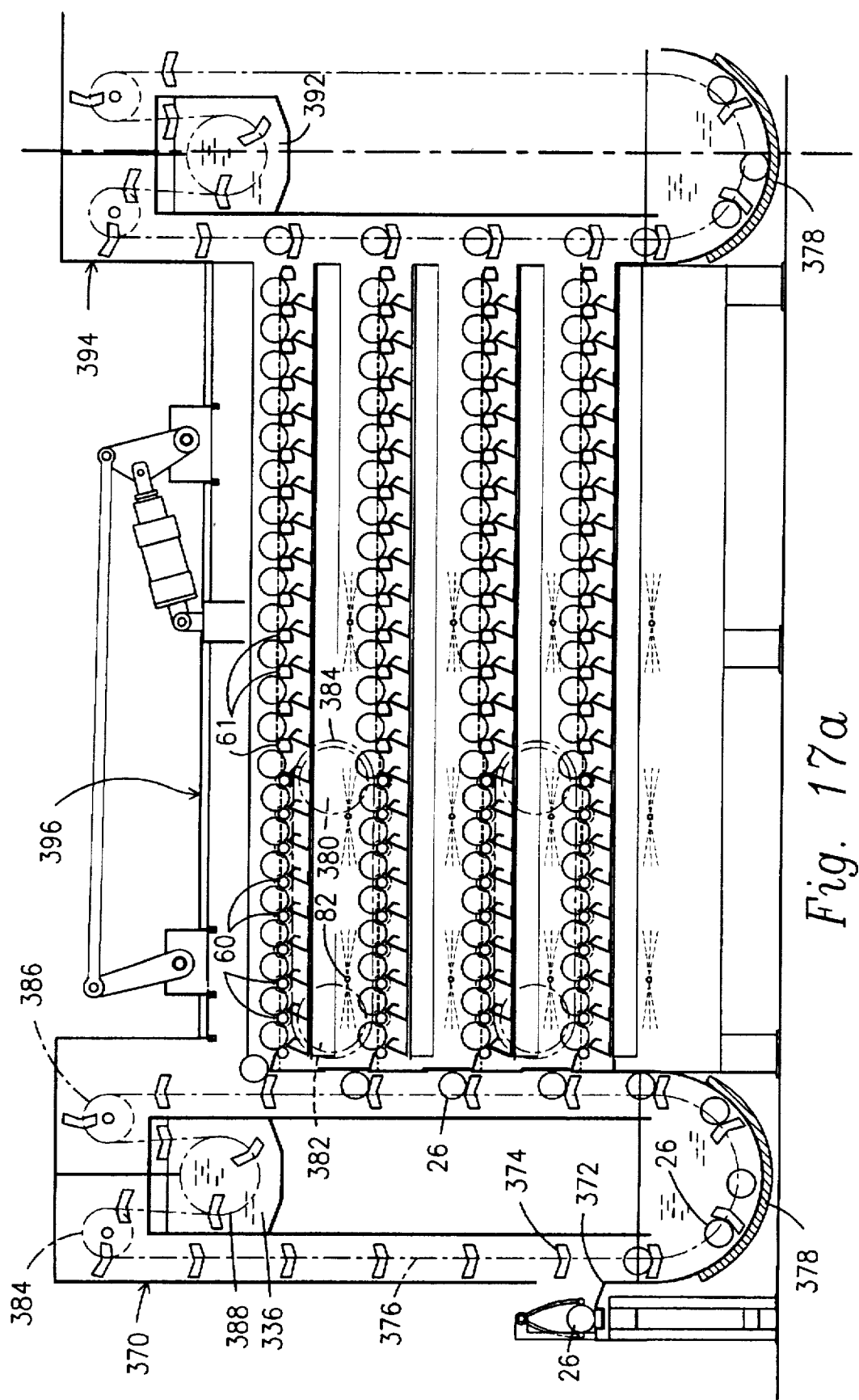
FIGS. 17A and 17B are side sectional elevations of two portions of a third preferred embodiment of the moving and thermal conditioning apparatus of this invention, generally similar to the embodiment of FIGS. 1A and 1B and 2 but employing differences in the entrance conveyor and in the transport mechanism.
Figure 17B:
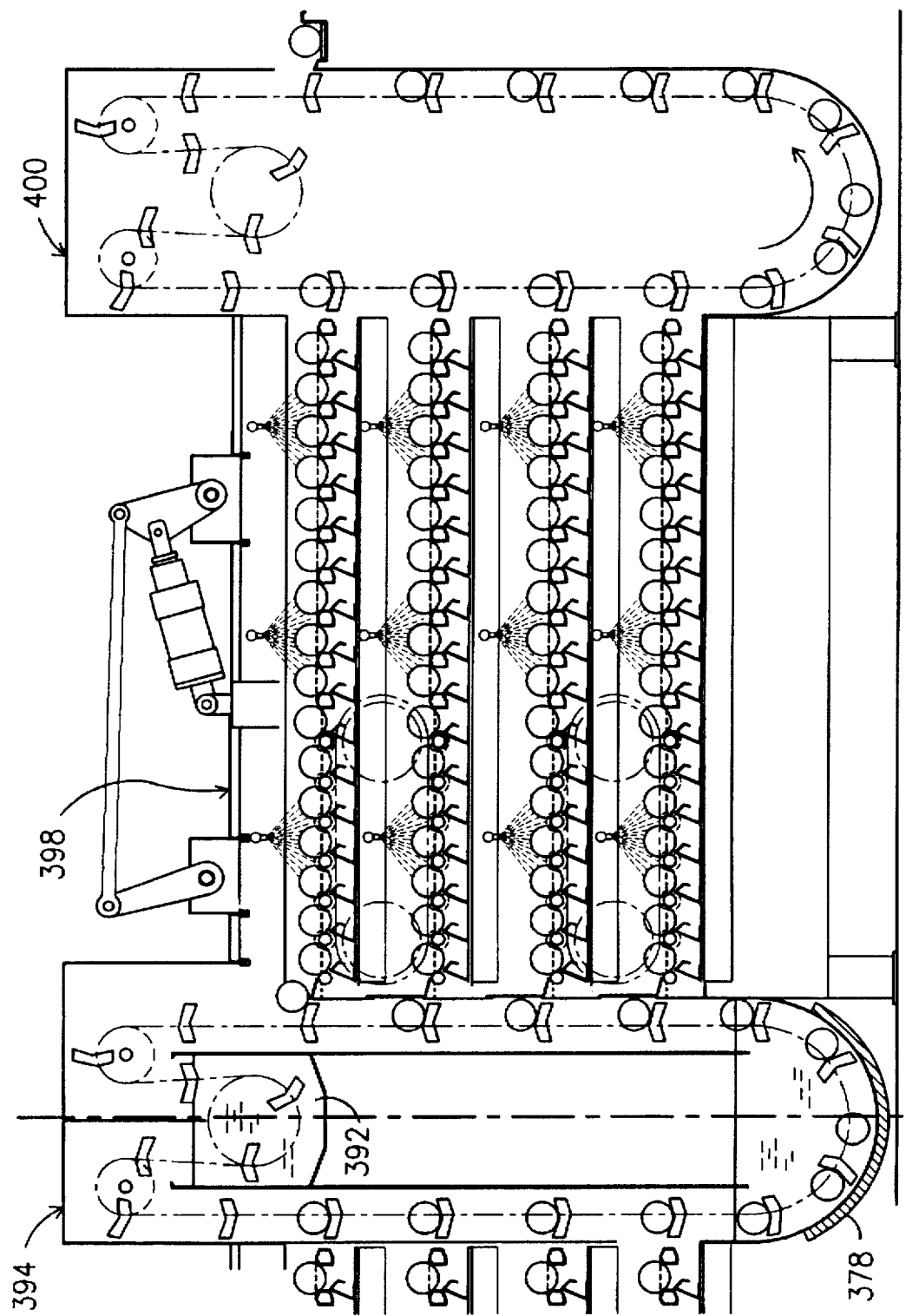

FIGS. 17A and 17B depict yet another variation of the structure for the entrance and removal conveyor along with a modified structure for supporting the containers on the transport mechanisms described above. Except as described below, the apparatus of these figures functions in substantially the same manner as that of FIGS. 12 through 16.

Figure 12:
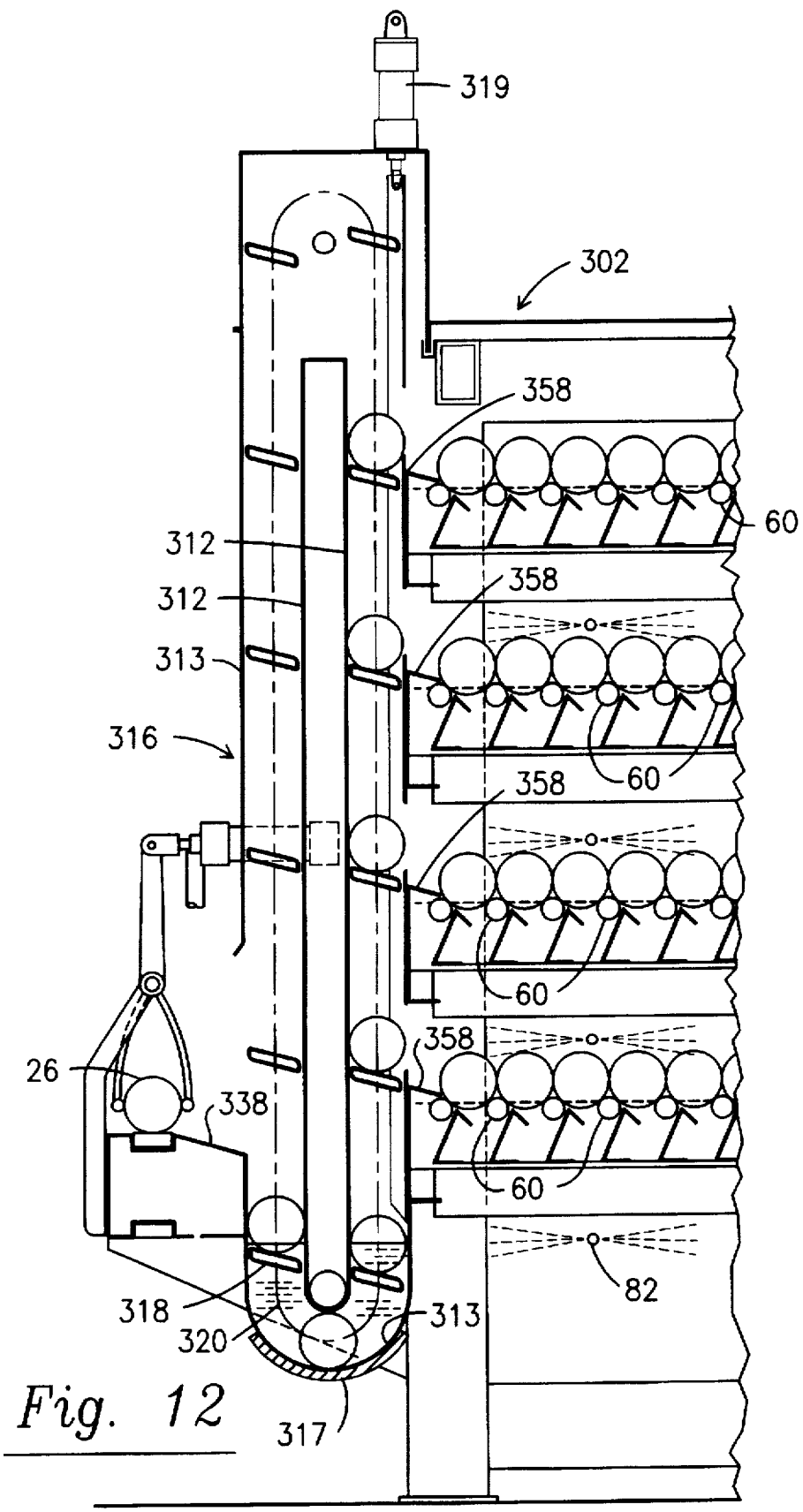
FIG. 12 is a side sectional view of an alternative entrance conveyor for use with the apparatus of FIGS. 1A and 1B or 7.

The entrance conveyor, generally indicated by reference numeral 370, conveniently utilizes substantially the same type of end feed apparatus described with respect to FIGS. 1 and 12, with an inclined ramp 372 down which the containers 26 roll onto the feeder bars 374, which conveniently are carried by a mechanism such as chain 376. These feeder bars 374 are preferably of slightly V-shaped configuration, initially cradling the containers 26 as they enter the conveyor from the ramp 372. As the containers 26 descend down into the generally U-shaped hydraulic lock formed by the curved, U-shaped portion of the conveyor path adjacent its lowermost points, the feeder bar 374 will move away from its cradling engagement of one container 26 and bear against the container 26 now in front of it along the path, as shown in FIG. 17A. This conveyor preferably includes around its lowermost portion the magnetic urging means 378 described above with respect to the other embodiments.

As the containers 26 are lifted by the carrier bars 374 out of the hydraulic lock, the angled portion of the feeder bars 374 urges the containers toward the outside of the conveyor path, as shown in FIG. 17A. Then, in the manner described with respect to FIG. 12, the containers are selectively discharged onto the supports 60 through the above described gate slides. In this embodiment the supports comprise a plurality of rotatably driven rollers 60 and also a plurality of nonrotatable supports 61. These supports, and also the indexing mechanism, are shown in larger scale on FIGS. 18 through 20. Each of these supports 60 and 61 is spaced from one another with each support having a longitudinal axis extending generally transversely of the direction of movement of the containers and generally parallel to the axes of the other supports, and of the containers 26 moving therethrough. Adjacent such pairs of the supports are spaced apart a predetermined distance less than the diameter of any container 26. The conventional mechanism for rotatably driving the rollers 60 is shown in FIG. 17A and may suitably comprise a driven wheel 380 with a idler wheel 382 and a resilient belt 384 connecting those two wheels 380 and 382 and bearing against the rollers 60 on transports above and below the axes of the wheels 380 and 382.

Figure 18:
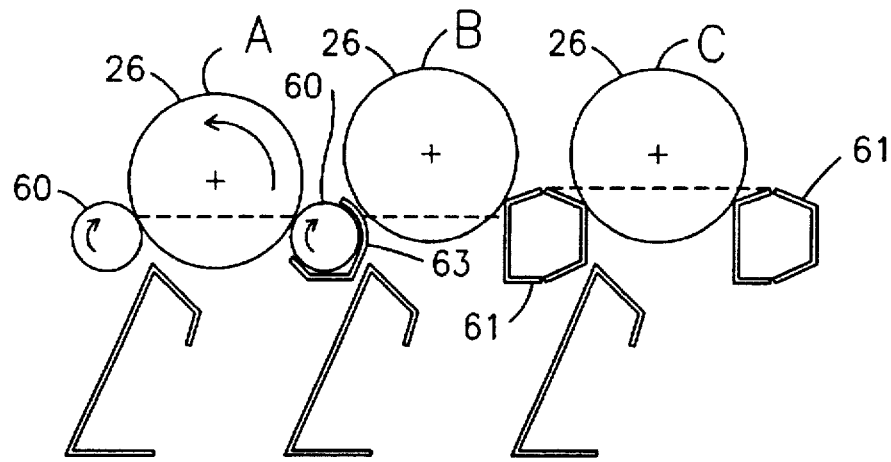
FIGS. 18 through 20 are schematic representations illustrating the movement of the indexing members of the transport apparatus of this third embodiment of FIGS. 17A and 17B.
Figure 19:
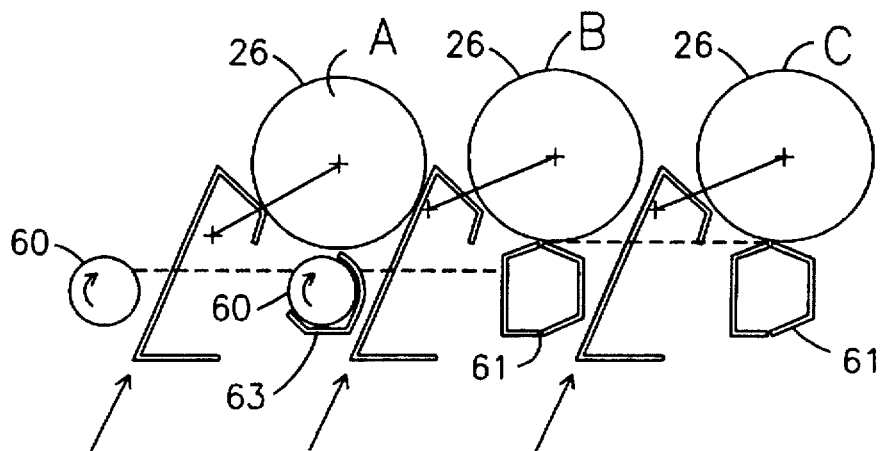
Figure 20:
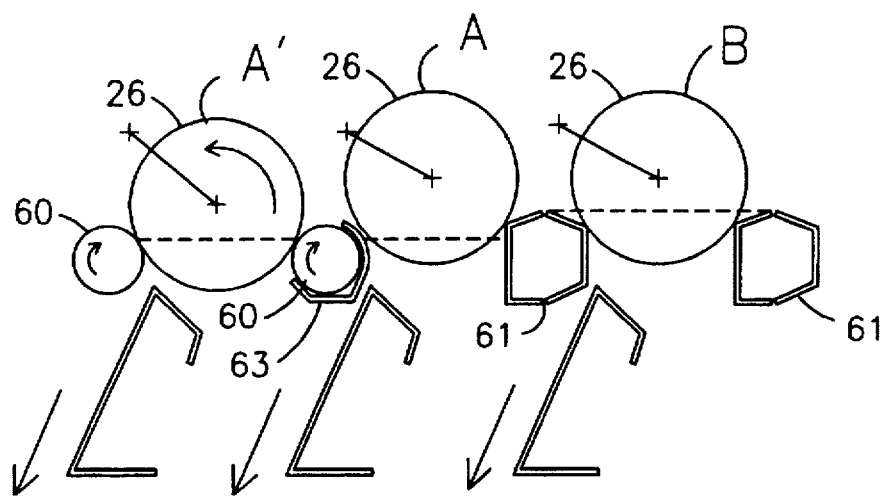

In addition to the plurality of rollers 60, the supports for the containers in the transport structure of the embodiment of FIGS. 17A and 17B also includes a plurality of nonrotatable supports 61, shown at a larger scale on FIGS. 18 through 20. While the cans are supported by the rollers 60, they are rotated as they are being thermally conditioned. However, it has been found that it is not necessary to rotate the containers at all points during their passage along the transport structure through this apparatus.

In this embodiment, the indexing movement of the containers, illustrated in FIGS. 18 through 20 is substantially similar to that described above with respect to FIGS. 3 through 6, and will not be repeated. However, it can be seen that at some point the container labeled "A" in FIG. 18 will reach the point of engagement between the last two pairs of adjacent rollers. As this container "A" is then indexed to the next position (to the right in these drawings), it is brought to rest upon the first fixed support 61 and upon the shield 63 covering the right side of the last roller 60. Subsequent indexing of this container "A", from this position of FIG. 20, will then bring it into engagement with two fixed supports 61, such as support the container "B" in FIG. 20. As shown in FIG. 17A, this embodiment then provides for support of the containers on these fixed supports up to the point that they are moved to the removal conveyor.

Another difference between the embodiment of FIGS. 17A and 17B and those described above is the provision of the upper environmental isolating means or hydraulic lock shown on FIGS. 17A and 17B. In this embodiment the entrance conveyor suitably includes a pair of upper idler sprockets or pulleys 384 and 386 over which the chain 376 moves, along with a third pulley or sprocket 388. With this sprocket 388 the path of the entrance conveyor from the chamber interior continues through the enclosed channel over the sprocket 386, around the sprocket 388 and then over sprocket 384 on its way back to the entrance to receive additional containers. The portion of this conveyor channel proximal to and between the uppermost portions of the path of the conveyor is filled with a liquid, such as water, to form a hydraulic lock to further restrict communication between the chamber interior and exterior ambient conditions.

As shown on FIGS. 17A and 17B, a correspondingly similar hydraulic lock 392 is provided adjacent the upper portion of the path of the removal conveyor 394. In a manner analogous to the apparatus of FIG. 2, the container removal conveyor 394 from the first chamber 396 shown in FIG. 17A also functions as the entrance conveyor for the second chamber 398 shown in FIG. 17B. The functioning of these chambers is substantially analogous to that described above with respect to FIGS. 1A and 1B and 2, with the difference being the change in configuration of the conveyors to provide for a hydraulic lock adjacent the upper portion of conveyor 394. While such a hydraulic lock could also be provided for the removal conveyor 400, if desired, it frequently will not be necessary, as the containers 26 may have been cooled to a temperature close to that of outside ambient conditions in that second chamber 398. In other respects the operation of this chamber functions in the manner described above with respect to FIGS. 2 and 17A.

While the foregoing has described in detail several particularly preferred embodiments of the apparatus of this invention, it is to be understood that these descriptions are illustrative only of the principles of the invention and are not to be considered limitative thereof. Because numerous variations and modifications of both the structure and the method of operation, all within the scope of this invention, will readily occur to those skilled in the art, the scope of this invention is to be limited solely by claims appended hereto.

What is claimed is:

1. Apparatus for thermally conditioning generally cylindrical containers, comprising a chamber for receiving the cylindrical containers, said chamber including environmental isolating means for isolating the internal environment of said chamber from ambient conditions external to said chamber, said environmental isolating means comprising first isolating means positioned adjacent an entrance into said chamber and second isolating means positioned adjacent an exist from said chamber, said first isolating means comprising a hydraulic lock;

an entrance conveyor for carrying said containers from an entrance of said apparatus into the interior of said chamber, said entrance conveyor being configured to move said containers from said apparatus entrance through said first isolating means and then into the interior of said chamber;

a removal conveyor for moving said containers from said chamber interior to a location external to said chamber, said removable conveyor being configured to move said containers from said chamber interior through said second isolating means and then to said external location;

thermal conditioning means within said chamber for effecting a predetermined heat flow relative to said container to change the temperature of said container by a predetermined amount; and transfer means mounted to said apparatus within said chamber for moving said container from said entrance conveyor to said removal conveyor.

2. Thermal conditioning apparatus according to claim 1 wherein said transfer means comprises at least one transport for moving said containers from said entrance conveyor to said removal conveyor along a generally horizontal path.

3. Thermal conditioning apparatus according to claim 2 wherein said transfer means comprises a plurality of vertically spaced said transports extending generally parallel to one another within said chamber such that a plurality of such containers may be moved generally horizontally through said chamber along paths generally parallel to one another.

4. Thermal conditioning apparatus according to claim 2 wherein said transfer means further comprises means for moving each said container from said entrance conveyor to a respective said transport.

5. Thermal conditioning apparatus according to claim 2 wherein said transport comprises a plurality of supports spaced from one another with each said support having a longitudinal axis extending generally transversely of the direction of movement of said containers and generally parallel to said axes of the other said supports, with adjacent said supports being spaced from at least one adjacent said support in a generally horizontal direction a predetermined distance less than the diameter of any said container, whereby adjacent said pairs of said supports will support one such cylindrical container therebetween with the axis of such container generally parallel to the axes of such supports.

6. Thermal conditioning apparatus according to claim 5 wherein said supports comprise a plurality of rollers rotatably mounted to a chassis within said chamber for rotational movement only within said chamber.

7. Thermal conditioning means according to claim 5 wherein said supports further comprise a plurality of non-rotatable said supports.

8. Thermal conditioning apparatus according to claim 6 wherein said transport means further comprises means for rotatably driving said rollers, whereby the cylindrical containers supported thereupon will be rotated by such rotatably driven rollers.

9. Thermal conditioning apparatus according to claim 6 wherein said transport means further comprises indexing means adapted to provide for stepwise movement of said containers from said entrance conveyor, along said transport means and onto said removal conveyor.

10. Thermal conditioning apparatus according to claim 9 wherein said indexing means is adapted for urging said containers from support by one said pair of adjacent supports to support by an adjacent said pair of supports in a transport direction extending generally from said entrance conveyor toward said removal conveyor.

11. Thermal conditioning apparatus according to claim 10 wherein said indexing means comprises at least one indexing member interposed generally between each adjacent pair of said supports and mounted to a chassis movable with respect to both said chamber and said support chassis for movement both upwardly and in a direction extending from said entrance conveyor toward said removal conveyor.

12. Thermal conditioning apparatus according to claim 11 further comprising means for selectively imparting said movement to said indexing means chassis.

13. Thermal conditioning apparatus according to claim 12 wherein said movement comprises movement in a direction generally diagonally upwardly with respect to said transport direction.

14. Thermal conditioning apparatus according to claim 13 wherein said movement imparting means comprises means for selectively imparting a reciprocating movement along said diagonally upward direction.

15. Thermal conditioning apparatus according to claim 12 wherein said movement comprises movement around a closed path between a first vertical position in which said indexing member is out of engagement with said container and a second vertical position in which said indexing member engages the sidewall of said container and urges said container sidewall upwardly sufficiently to pass over one of said adjacent rollers and movement between a first horizontal position in which said indexing member is positioned proximal said roller of said pair that is closer to said entrance conveyor and a second horizontal position that is proximal said roller of said pair that is closer to said removal conveyor.

16. Thermal conditioning apparatus according to claim 15 wherein said movement imparting means comprises vertical actuating means for selectively effecting said generally vertical movement between said first vertical position and said second vertical position, and horizontal actuating means for selectively effecting said generally horizontal movement between said first horizontal position and said second horizontal position.

17. Thermal conditioning apparatus according to claim 16 wherein said horizontal movement effecting means provides for said generally horizontal movement from said first horizontal position to said second horizontal position when said vertical actuating means is in said second vertical position.

18. Thermal conditioning apparatus according to claim 16 wherein said horizontal movement effecting means provides for said generally horizontal movement from said second horizontal position to said first horizontal position when said vertical actuating means is in said first vertical position.

19. Thermal conditioning apparatus according to claim 1 wherein said entrance conveyor comprises a plurality of container-supporting members carried around a generally vertically extending closed path.

20. Thermal conditioning apparatus according to claim 19 wherein said environmental isolating means includes first environmental isolating means comprising a substantially enclosed channel through which said entrance conveyor moves from said apparatus entrance to said chamber interior, said channel having a curved portion proximal the lowermost portion of said path, said curved portion being filled with a liquid to form a hydraulic lock to restrict communication between said chamber interior and said exterior ambient conditions.

21. Thermal conditioning apparatus according to claim 20 wherein said first environmental isolating means further comprises said enclosed channel extending from a point adjacent said chamber interior to a point adjacent said apparatus entrance, with said path of said entrance conveyor describing a curved, generally u-shaped configuration proximal the uppermost portion of said path, the portion of said channel having said curved path being filled with a liquid to form a hydraulic lock to further restrict communication between said chamber interior and said exterior ambient conditions.

22. Thermal conditioning apparatus according to claim 20 wherein the path of movement of said entrance conveyor through said hydraulic lock is a generally U-shaped path, and said entrance conveyor further comprises means for urging said containers toward the outside of said U-shaped path.

23. Thermal conditioning apparatus according to claim 22 wherein said containers are made of a ferrous metal, and said container urging means comprises means for generating a magnetic field of sufficient strength to pull said containers toward said outside of said U-shaped path.

24. Thermal conditioning apparatus according to claim 23 wherein said magnetic field generating means comprises permanent magnet means.

25. Thermal conditioning apparatus according to claim 1 wherein said first environmental isolating means comprises a substantially enclosed channel through which said entrance conveyor moves from said apparatus entrance to said chamber interior, said channel being configured such that portions of said conveyor moving therethrough restrict communication between said chamber interior and said exterior ambient conditions.

26. Thermal conditioning apparatus according to claim 1 further comprising means for urging said containers from engagement with said entrance conveyor toward engagement with said transfer means.

27. Thermal conditioning apparatus according to claim 1 further comprising means for selectively blocking and permitting release of said containers from engagement with said entrance conveyor.

28. Thermal conditioning apparatus according to claim 1 wherein said removal conveyor comprises a plurality of container-supporting members carried around a generally vertically extending closed path.

29. Thermal conditioning apparatus according to claim 28 wherein said environmental isolating means includes second environmental isolating means comprising a substantially enclosed channel through which said removal conveyor moves said containers from said chamber interior to a location outside said chamber, said channel having a curved portion proximal the lowermost portion of said path, said curved portion being filled with a liquid to form a hydraulic lock to restrict communication between said chamber interior and said exterior ambient conditions.

30. Thermal conditioning apparatus according to claim 29 wherein the path of movement of said entrance conveyor through said hydraulic lock is a generally U-shaped path, and said entrance conveyor further comprises means for urging said containers toward the outside of said U-shaped path.

31. Thermal conditioning apparatus according to claim 30 wherein said containers are made of a ferrous metal, and said container urging means comprises means for generating a magnetic field of sufficient strength to pull said containers toward said outside of said U-shaped path.

32. Thermal conditioning apparatus according to claim 31 wherein said magnetic field generating means comprises permanent magnet means.

33. Thermal conditioning apparatus according to claim 32 wherein said removal conveyor comprises a plurality of container support members carried around a closed path from within said chamber, through said hydraulic lock to a location outside said chamber, and then back into said chamber through a chamber entrance, and said chamber environmental isolating means further comprises means maintaining substantially closed said chamber entrance of said removal conveyor while permitting periodic momentary opening thereof to permit the passage of each said container support member thereinto.

34. Thermal conditioning apparatus according to claim 1 further comprising means for urging said containers from engagement with said removal conveyor, whereby the containers are removed from the removal conveyor.

35. Thermal conditioning apparatus according to claim 1 further comprising means for selectively blocking and permitting release of said containers from engagement with said removal conveyor.

36. Thermal conditioning apparatus according to claim 1 wherein said environmental isolating means includes second environmental isolating means comprising a substantially enclosed channel through which said removal conveyor moves from said chamber interior to said location external to said chamber, said channel being configured such that portions of said conveyor moving therethrough restrict communication between said chamber interior and condition external to said chamber.

37. Thermal conditioning apparatus according to claim 1 wherein said thermal conditioning means in said first chamber comprises means for heating said container, and said thermal conditioning means in said second chamber comprises means for cooling said containers.

38. Thermal conditioning apparatus according to claim 1 wherein said chamber environmental isolating means further includes enclosing means enclosing the portion of the path of movement of said entrance conveyor extending from within said chamber to said apparatus entrance for restricting communication between said chamber internal environment and said external ambient conditions.

39. Thermal conditioning apparatus according to claim 1 wherein said second environmental isolating means comprises a hydraulic lock through which passes said removal conveyor and all said containers carried thereby.

40. Thermal conditioning apparatus according to claim 1 further comprising at least two said chambers, with the internal environment of each said chamber being generally isolated from the internal environment of the other said chamber, the first said chamber being provided with said entrance conveyor and said removal conveyor and the second said chamber being provided with said removal conveyor, and said removal conveyor of said first chamber serving as the entrance conveyor for said second chamber;

said transfer means being provided within each said chamber, with the internal environment of each said chamber being generally isolated from the internal environment of the other said chamber; and separate thermal conditioning means within each said chamber, such that said heat flow relative to said container is substantially different for each said chamber.

* * * * *

UNITED STATES PATENT AND TRADEMARK OFFICE
CERTIFICATE OF CORRECTION

PATENT NO. : 5,766,002
DATED : June 16, 1998
INVENTOR(S) : Silvestrini

It is certified that error appears in the above-indentified patent and that said Letters Patent is hereby corrected as shown below:

Column 13, line 25 replace the word "exist" with --exit--.

Signed and Sealed this

Twenty-second Day of September, 1998

Attest:

BRUCE LEHMAN

Attesting Officer

*Commissioner of Patents and Trademarks*